Dec. 2, 1952     W. BARTELT     2,619,934
HEN'S NEST
Filed June 3, 1949
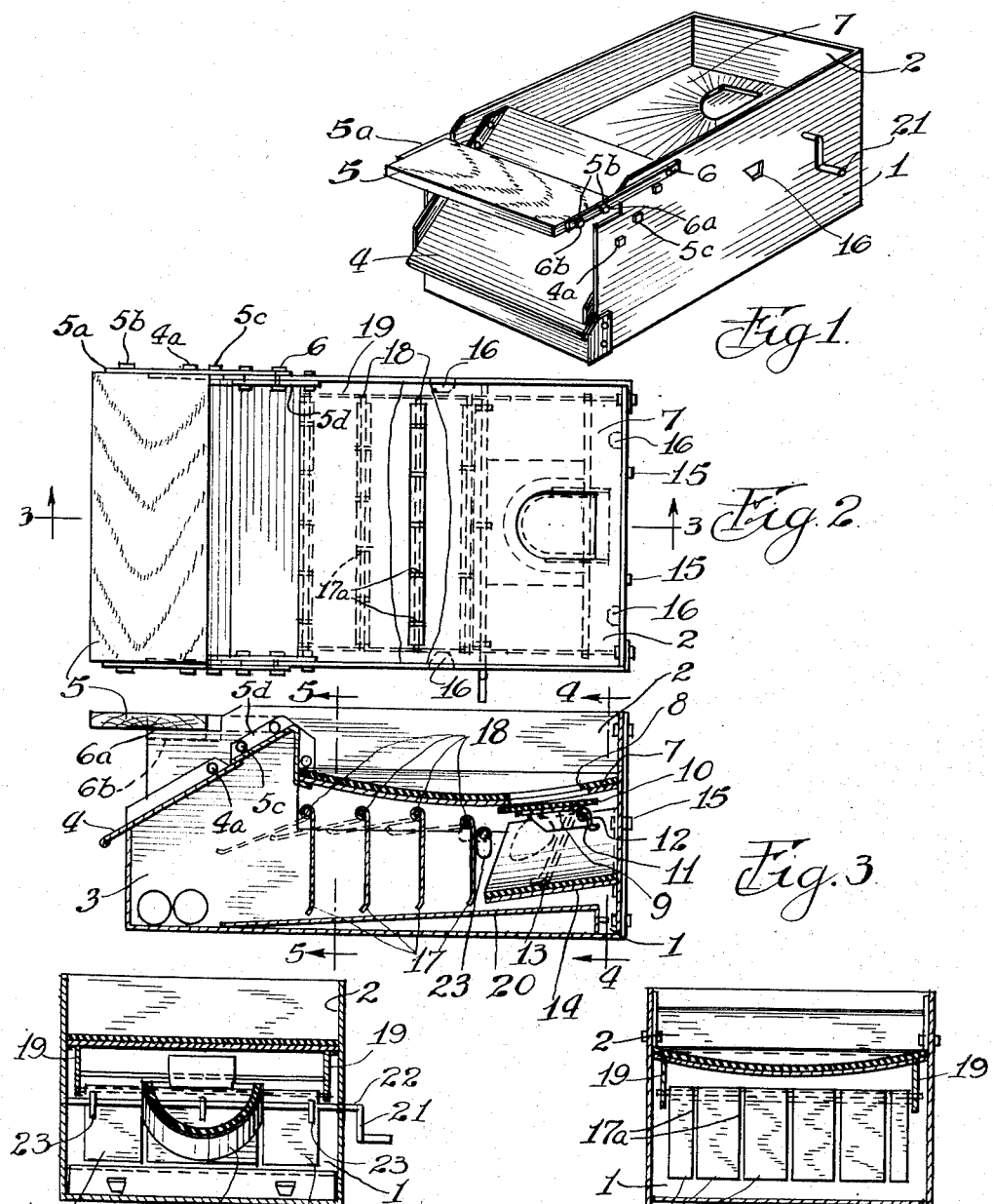

Patented Dec. 2, 1952

2,619,934

UNITED STATES PATENT OFFICE 2,619,934

HEN'S NEST

William Bartelt, Campbellsport, Wis.

Application June 3, 1949, Serial No. 96,960

3 Claims. (Cl. 119—48)

The present invention relates to the poultry industry and it is the object of the invention to provide an improved hens' nest.

It is the primary object of the invention to provide a hens' nest which is sanitary and can be easily and conveniently cleaned, which prevents breakage of eggs and which prevents injury to the hens occupying the nest.

Many types of hens' nests incorporating features intended to attain one or the other of the foregoing objectives are known. However, they are not commonly found on the market owing to several shortcomings, which, it is believed, have been overcome by the present invention. Nests heretofore known were unsatisfactory as it was found difficult to properly clean them and the means for preventing breakage of eggs were of a type which did not accomplish their intended purpose.

Thus, attempts have been made to control the rolling of the eggs into the collecting box by means of strips of canvas or other soft material suspended in the path of the rolling eggs. This has been found to be undesirable because it frequently occurs that the canvas stops the rolling of an egg completely so that, when the next egg comes rolling down toward the depository it collides with that which is wedged under the curtain and one or both of the colliding eggs break. This is not only a loss, but it soils the entire nest as well as other eggs.

On the other hand, if the canvas curtain is too light, the retarding effect on a large rolling egg is insufficient so that such a heavy egg can strike the eggs already accumulated in the collecting box and cause breakage.

Another objectionable feature of hens' nests known heretofore is that the closure plate which covers the delivery opening in the bottom of the nest, and which necessarily must close upwardly is apt to close on one foot or both feet of a hen, thereby trapping the fowl and making it reluctant to return to the nest or even injuring the fowl.

These and other shortcomings of hens' nests have been overcome by the present invention. The improved construction is hereinafter described and explained in detail with reference to the accompanying drawings, in which Fig. 1 is a perspective view of the hens' nest according to the invention showing the nest ready for occupancy;

Fig. 2 is a top plan view with parts broken away of the nest according to Fig. 1, showing the location of some of the essential operating components of the device in dotted lines;

Fig. 3 is a cross section taken along the line 3—3 in Fig. 2;

Fig. 4 is a cross section taken along the line 4—4 in Fig. 3;

Fig. 5 is a cross section taken along the line 5—5 in Fig. 3.

As shown in Fig. 1, the hens' nest according to the present invention comprises a box preferably of sheet metal formed into a base box 1 and a nest box 2. The base box 1 is larger than the nest box 2 as more clearly illustrated in Fig. 3 and has at the end not covered by the nest box an egg collecting box or depository 3 covered with a lid 4 hinged by bolts or rivets at 4a (Fig. 3). Above the hinged lid is a perch board 5 supported by arms 5a to which it is fastened by bolts 5b. The arms 5a are hinged to the box by means of studs 6 (Fig. 2) which, together with bolts 5c support the upturned flanges 5d of the top of the box. This perch board is moved downwardly in the day time to allow the hens to enter the nest, and it is moved upwardly at night time to prevent the fowl from entering and also to permit opening the lid 4 on the egg collecting box. In the horizontal position the arms 5a and the perch board are supported on ledges 6a which are formed by bending a small portion 6b of the upper edge of the metal box downwardly.

The nest box 2 is provided with a removable nest plate 7 which converges downwardly towards the rear end of the nest, forming a somewhat oval indentation the lowest portion of which is around an aperture 8 near the rear end of the box. The top of this nest plate is covered with a soft material such as sponge rubber which can be readily cleaned, for example by washing, when the nest plate is removed from the box 2.

The aperture in the nest plate is covered from below by means of a closure 9, 10 comprising a disk of rigid material 9 such as metal covered by a disk of soft material 10 and operated by a lever 11 and a counterweight 12 (Fig. 3). The rigid disk 9 is smaller than the aperture 8 in the nest plate. The disk 10 of soft material which may be sponge rubber like the material on the nest plate 7, is considerably larger in surface area than the aperture 8. The lever 11 and counterweight 12 brings the closure to rest in substantially horizontal position against the forward portion of the aperture, while leaving a small gap below the back portion of the aperture to allow the end portion of the disk to move unimpededly. Since the metal disk is of smaller surface area than the aperture and smaller than the rubber disk, there remains a soft circular cover portion all around the aperture, intermediate the aperture and the metal disk 9 so that, if a fowl put its foot into the aperture it can remove it without it becoming wedged between the cover and the aperture.

Underneath the aperture and its closure, fastened at one end to the end panel of the base box a trough-shaped guide piece 13 of soft material stiffened by a metal casing 14 of the same conformation is disposed, which slopes downwardly toward the front of the nest. This guide piece receives the eggs dropped through the aperture and directs them into the egg collecting depository 3. It is removably supported on the end panel of the base box by means of bolts 15 or other supporting means.

As indicated in Figs. 1, 2 and 3 the nest plate 7 is supported in the sides of the frame by means of lugs 16 which are punched out of the sides of the box. Thus the nest plate 7 forms the bottom of the nest box 2.

Below the nest plate are movably suspended a plurality of vanes 17 of light material, such as thin sheet metal. Any type of suspension means can be employed and in the embodiment shown a plurality of rods 18 which are supported in side strips 19, preferably formed out of the same sheet of material as the nest plate, serve for this purpose. Adjacent vanes are spaced from one another by means of washers 17a or the like to prevent jamming. The rows of vanes are spaced from one another by a distance which is less than the length of the vanes for reasons explained hereinafter. The downward extent of the vanes increases progressively toward the egg depository into a plane which corresponds to the slope of the false bottom 20 of the box.

A movable false bottom 20 is provided in the base box 1 which has a slight slope toward the egg collection compartment or depository 3. This slope corresponds to the slope of the downward extent of the successive rows of vanes. Thus, if the false bottom is moved forwardly it can be made to touch the ends of the vanes 17, which slightly impedes or retards the movement of the vanes. This affords a considerable control over the movement of heavy eggs which would roll too rapidly through the vanes without this slight retarding effect.

Nevertheless, even without the retarding action of the false bottom the vanes offer sufficient resistance to average size eggs to reduce their rolling speed, to such an extent that eggs frequently stop rolling between the second and third or the third and fourth row of vanes. This, however is no disadvantage, because it is a desideratum that the eggs should move slowly and should rather stop rolling than roll too rapidly. Moreover, the next egg which follows the one which has stopped between the rows of vanes cannot touch the stopped egg, because it must first move the vane which is in its path and that vane will then touch the stopped egg and will start it rolling again.

In fact, owing to the length of the vanes being greater than the distance between the rows of vanes an egg which raises a vane in the first row will raise a vane in the second row by the vane in the first row touching that in the second row before the egg comes in contact with the vane in the second row which it thus moves at first indirectly.

It can also be seen from Figs. 2, 4 and 5 that the vanes in successive rows are of smaller width than the vanes in the first row and that each full size vane in a preceding row is adapted to engage at least two vanes in a succeeding row. As a consequence the vanes in the first row always move at least the two vanes in the second row which are nearby, and each vane of full width in the second row will move at least two vanes in the third row, and so on. Consequently, if an egg has rolled over to one side and stopped between rows, the following egg will usually start it rolling again by the mere touch of the vane which is behind the stopped egg.

Yet, even if an egg should roll to a side wall of the box and stop between vanes and if the succeeding eggs should fail to move the vane behind it, it can be readily moved into the egg collection compartment or depository by manually moving the crank 21 which is attached to a rod 22 which extends through the box behind the first row of vanes and is provided with little cams 23, adapted to raise the vanes into the position indicated by dotted lines in Fig. 3. Rod 22 can be supported in other ways, for example by the metal strips 19.

It is, of course, possible to suspend the vanes in any convenient manner without departing from the spirit of the invention.

While I have described the basic principles of my invention in connection with the preferred embodiment in which these principles are incorporated, I do not wish to be limited to the embodiment shown, but what I claim is:

1. In a hen's nest having a base portion and a nest box atop said base portion, a concave nest plate disposed in said nest box and having an aperture, a sloped bottom in said base portion leading to an egg depository and a plurality of retarding vanes vertically suspended below said nest plate and extending proximate said sloped bottom intermediate said aperture and said egg depository, retarding vanes being arranged in rows and being disposed in a manner that at least one vane in a preceding row along the path of travel of the eggs is capable, when moved, to touch and raise at least two vanes in the succeeding row.

2. In a hen's nest having a base portion and a nest box atop said base portion, a concave nest plate disposed in said nest box and having an aperture, a closure disk hinged to the bottom of said nest plate adapted to cover said aperture and provided with a lever and a weight to hold said disk against said aperture, a sloped bottom in said base portion leading to an egg depository and a plurality of retarding vanes vertically suspended below said nest plate and extending proximate said sloped bottom intermediate said aperture and said egg depository, said retarding vanes being arranged in rows, each succeeding row along the downward slope of said bottom having more vanes than the first row and having pairs of vanes defining spaces therebetween which are staggered with respect to the spaces in the preceding row.

3. In a hen's nest having a base portion and a nest box atop said base portion, a concave nest plate disposed in said nest box and having an aperture, a sloped bottom in said base portion leading to an egg depository and a plurality of sheet metal retarding vanes or blades movably suspended below said nest plate and extending proximate said sloped bottom intermediate said aperture and said egg depository, said vanes or blades being aligned in rows and movable independently of one another, and each preceding row having at least one vane or blade adapted, when moved toward said egg depository, to touch at least two of the vanes or blades in the next succeeding row.

WILLIAM BARTELT.

REFERENCES CITED

The following references are of record in the file of this patent:

UNITED STATES PATENTS

| Number | Name | Date |
|---|---|---|
| 429,008 | Bridenbecker | May 27, 1890 |
| 843,850 | Smidesang | Feb. 12, 1907 |
| 1,163,890 | Carr | Dec. 14, 1915 |
| 1,286,924 | Bowen | Dec. 10, 1918 |
| 1,325,038 | Ostgaard | Dec. 16, 1919 |
| 1,489,563 | Wahlborg | Apr. 8, 1924 |
| 1,911,633 | Lohrer | May 30, 1933 |

FOREIGN PATENTS

| Number | Country | Date |
|---|---|---|
| 61,737 | Germany | Apr. 26, 1892 |